US012225882B1

(12) United States Patent
Willinger

(10) Patent No.: US 12,225,882 B1
(45) Date of Patent: Feb. 18, 2025

(54) ANIMAL TREAT DISPENSER

(71) Applicant: Jonathan Willinger, Tenafly, NJ (US)

(72) Inventor: Jonathan Willinger, Tenafly, NJ (US)

( * ) Notice: Subject to any disclaimer, the term of this patent is extended or adjusted under 35 U.S.C. 154(b) by 40 days.

(21) Appl. No.: 17/957,502

(22) Filed: Sep. 30, 2022

Related U.S. Application Data

(60) Provisional application No. 63/294,334, filed on Dec. 28, 2021.

(51) Int. Cl.
A01K 15/02 (2006.01)
(52) U.S. Cl.
CPC .................................. A01K 15/026 (2013.01)
(58) Field of Classification Search
CPC .................. A01K 15/02; A01K 15/025–026
USPC ................................................. 119/707–711
See application file for complete search history.

(56) References Cited

U.S. PATENT DOCUMENTS

| | | | | |
|---|---|---|---|---|
| 848,136 A * | 3/1907 | Smith | .................. | A01K 15/025 119/711 |
| 1,031,095 A * | 7/1912 | Smith | .................. | A01K 15/025 119/711 |
| 2,718,873 A * | 9/1955 | Buckner | .............. | A01K 15/025 119/711 |
| 3,106,397 A * | 10/1963 | Lacey | ..................... | A63B 43/04 446/486 |
| 3,315,640 A * | 4/1967 | Gamble | ................ | A01K 15/025 119/707 |
| D287,988 S | 1/1987 | Billinghurst | | |
| 4,742,799 A * | 5/1988 | Schlitz | ................. | A01K 15/025 119/707 |
| 5,332,221 A * | 7/1994 | Reed | ....................... | A63F 9/083 273/109 |
| 5,343,828 A * | 9/1994 | Houghton | ............ | A01K 5/0114 434/259 |
| 5,722,348 A * | 3/1998 | Phillips | ..................... | A01K 1/03 119/421 |
| 5,813,366 A * | 9/1998 | Mauldin, Jr. | ........ | A01K 15/025 119/710 |
| 5,947,061 A | 9/1999 | Markham et al. | | |
| 5,965,182 A * | 10/1999 | Lindgren | ................. | A23G 9/00 426/805 |
| 6,073,581 A | 6/2000 | Wang | | |
| 6,098,571 A * | 8/2000 | Axelrod | ............... | A01K 5/0114 119/710 |
| 6,129,053 A | 10/2000 | Markham et al. | | |
| 6,186,095 B1 * | 2/2001 | Simon | .................. | A01K 15/025 119/707 |

(Continued)

FOREIGN PATENT DOCUMENTS

| CN | 302763125 | 3/2014 |
|---|---|---|
| CN | 302984655 | 10/2014 |

(Continued)

OTHER PUBLICATIONS

Merged translation of EP-1627571-A1 (Year: 2006).*

Primary Examiner — Morgan T Jordan
(74) Attorney, Agent, or Firm — Myers Wolin, LLC

(57) ABSTRACT

An animal treat dispenser includes a protective outer structure and an inner treat dispenser. The inner treat dispenser is supported by the protective outer structure. The inner treat dispenser is provided with a resilient opening. The resilient opening is configured to accommodate treats of different sizes. The resilient opening is further configured to resiliently grip the treats of different sizes.

15 Claims, 8 Drawing Sheets

(56) References Cited

U.S. PATENT DOCUMENTS

| | | | |
|---|---|---|---|
| 6,557,496 B2 * | 5/2003 | Herrenbruck | A63H 33/30 |
| | | | 119/710 |
| 6,622,659 B2 | 9/2003 | Willinger | |
| 6,651,590 B2 | 11/2003 | Willinger et al. | |
| D494,716 S * | 8/2004 | Chang | D21/713 |
| D498,274 S | 11/2004 | Wechsler | |
| D514,263 S | 1/2006 | Willinger | |
| 7,246,574 B2 * | 7/2007 | Renforth | A01K 15/025 |
| | | | 119/702 |
| D549,889 S | 8/2007 | Winkler et al. | |
| D563,609 S | 3/2008 | Gick | |
| D583,113 S | 12/2008 | Simon | |
| 7,555,997 B2 * | 7/2009 | Wolfe, Jr. | A01K 15/026 |
| | | | 119/707 |
| 7,600,488 B2 * | 10/2009 | Mann | A01K 15/026 |
| | | | 119/710 |
| 7,640,894 B2 | 1/2010 | Jager | |
| 7,866,281 B2 | 1/2011 | Willinger | |
| 7,950,352 B2 | 5/2011 | Specht | |
| D642,339 S | 7/2011 | Levin et al. | |
| D646,735 S | 10/2011 | Nichols et al. | |
| 8,235,762 B2 | 8/2012 | Rutherford et al. | |
| 8,418,656 B2 | 4/2013 | Rutherford et al. | |
| 8,468,977 B2 | 6/2013 | Markham | |
| 8,584,620 B2 | 11/2013 | Rutherford et al. | |
| 8,746,182 B2 | 6/2014 | Anderson | |
| 8,820,268 B2 | 9/2014 | Valle et al. | |
| 8,960,130 B2 | 2/2015 | Willinger et al. | |
| 8,978,590 B2 | 3/2015 | Nunn et al. | |
| 9,021,990 B2 | 5/2015 | Rutherford et al. | |
| 9,288,969 B2 | 3/2016 | Christianson et al. | |
| 9,462,787 B2 | 10/2016 | Christianson et al. | |
| 9,526,230 B2 * | 12/2016 | Day | A01K 15/025 |
| D776,371 S | 1/2017 | Tome | |
| D782,874 S | 4/2017 | Ross | |
| 9,675,050 B2 | 6/2017 | Valle | |
| 9,844,703 B1 | 12/2017 | Gupta et al. | |
| D810,364 S | 2/2018 | Wilson et al. | |
| D814,579 S | 4/2018 | Williams | |
| D821,661 S | 6/2018 | Burchman et al. | |
| 9,992,975 B2 | 6/2018 | Wolfe, Jr. et al. | |
| 10,085,422 B1 * | 10/2018 | Tsengas | A01K 15/025 |
| D839,496 S | 1/2019 | Steinkraus | |
| 10,201,151 B2 | 2/2019 | Zhang | |
| D848,682 S | 5/2019 | Baker | |
| 10,285,380 B1 | 5/2019 | Mullin | |
| 10,485,220 B2 | 11/2019 | Valle | |
| D870,986 S | 12/2019 | Wilhelm et al. | |
| 10,549,158 B2 | 2/2020 | Gupta et al. | |
| 10,721,915 B1 | 7/2020 | Tsengas | |
| 10,888,068 B2 | 1/2021 | Yang et al. | |
| D910,248 S | 2/2021 | Luk | |
| 10,932,447 B2 | 3/2021 | Baker | |
| 10,973,207 B1 | 4/2021 | Ettehadieh | |
| 11,000,015 B1 | 5/2021 | Ikegami et al. | |
| 11,071,281 B1 | 7/2021 | Ikegami et al. | |
| 11,617,351 B2 * | 4/2023 | Karras | A01K 15/025 |
| | | | 119/707 |
| 2001/0008125 A1 * | 7/2001 | Mann | A01K 15/026 |
| | | | 119/709 |
| 2002/0124811 A1 | 9/2002 | Willinger et al. | |
| 2008/0064292 A1 * | 3/2008 | Willinger | A63H 5/00 |
| | | | 446/397 |
| 2008/0141948 A1 * | 6/2008 | Renforth | A01K 15/026 |
| | | | 119/710 |
| 2014/0373788 A1 * | 12/2014 | Ragonetti | A01K 15/025 |
| | | | 119/51.01 |
| 2015/0020748 A1 | 1/2015 | Wechsler | |
| 2016/0278342 A1 * | 9/2016 | Wolfe, Jr. | A01K 5/0114 |
| 2018/0271062 A1 * | 9/2018 | Toolan | A01K 15/026 |
| 2019/0021286 A1 * | 1/2019 | Baker | A01K 5/0114 |
| 2020/0154676 A1 * | 5/2020 | Walt | A01K 15/026 |
| 2020/0288672 A1 * | 9/2020 | Wolfe, Jr. | A01K 15/026 |

FOREIGN PATENT DOCUMENTS

| | | | |
|---|---|---|---|
| CN | 303940130 | 11/2016 | |
| CN | 303999518 | 1/2017 | |
| CN | 304350902 | 11/2017 | |
| CN | 304350903 | 11/2017 | |
| CN | 304350904 | 11/2017 | |
| CN | 304377236 | 11/2017 | |
| EP | 1627571 A1 * | 2/2006 | A01K 15/026 |
| KR | 10-2021-0103849 A | 8/2021 | |

* cited by examiner

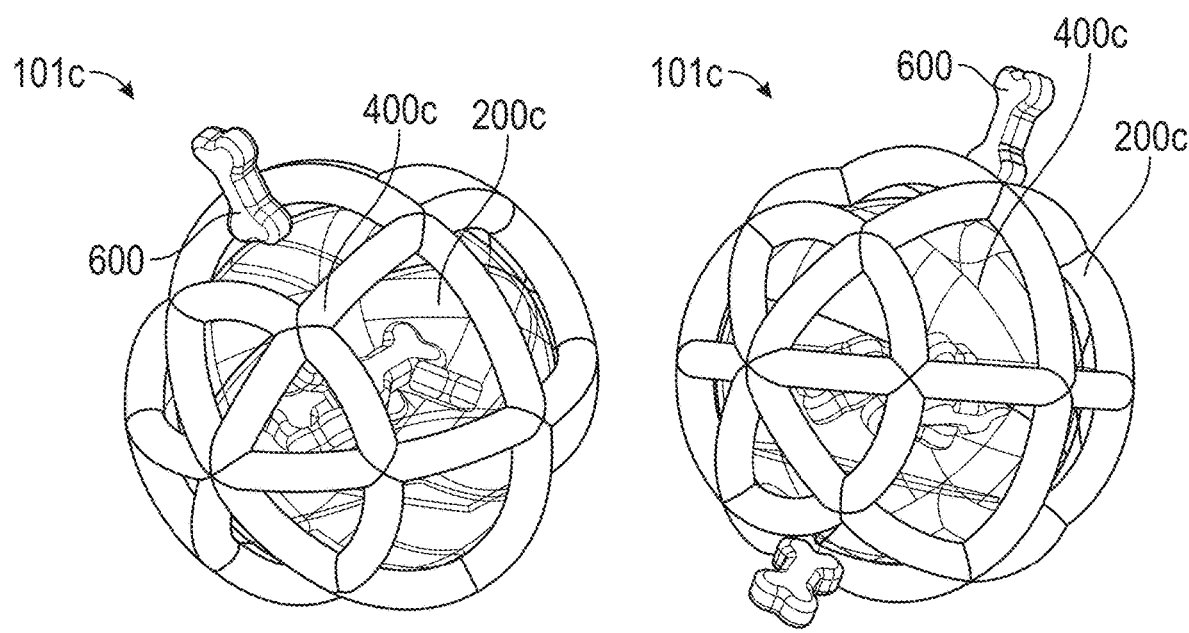
*FIG. 4A*
*FIG. 4B*
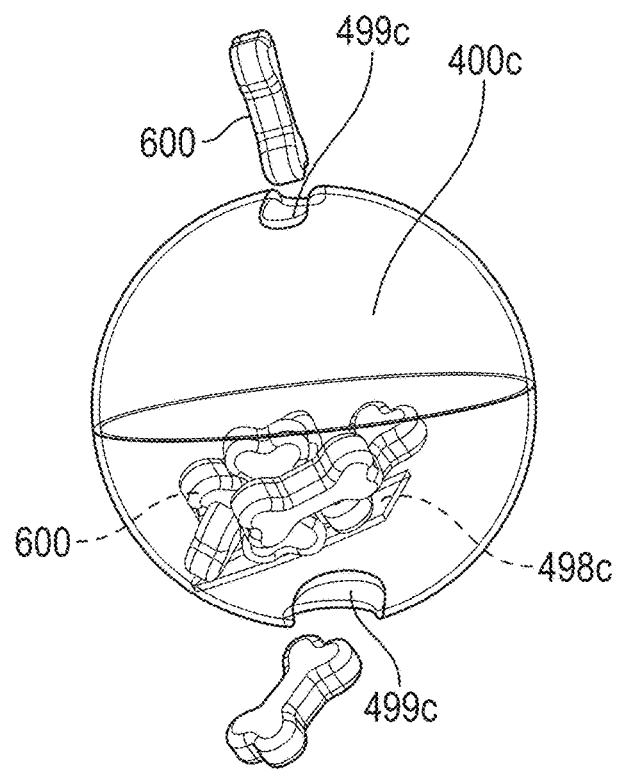
*FIG. 4C*

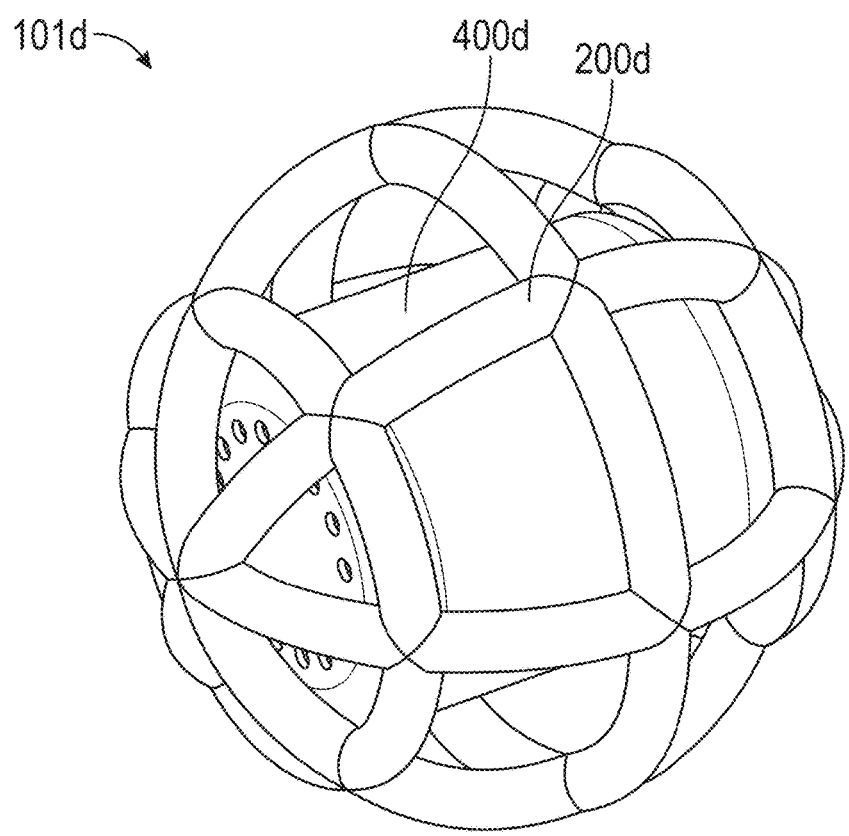
*FIG. 5A*
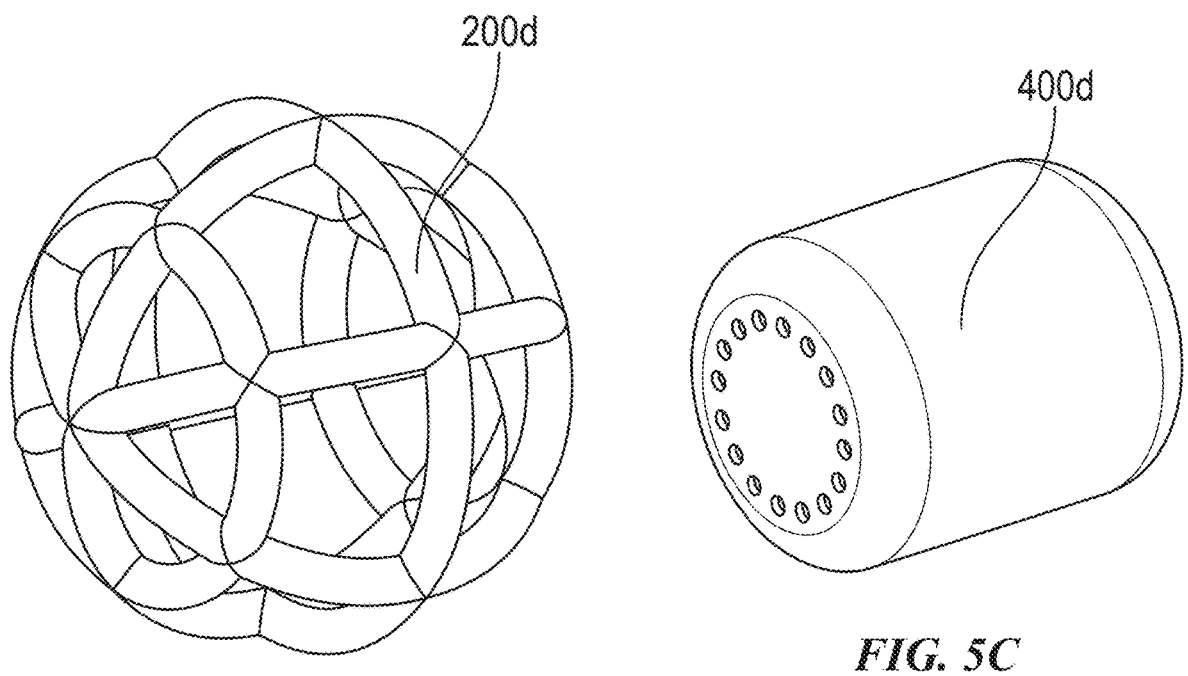
*FIG. 5B*
*FIG. 5C*

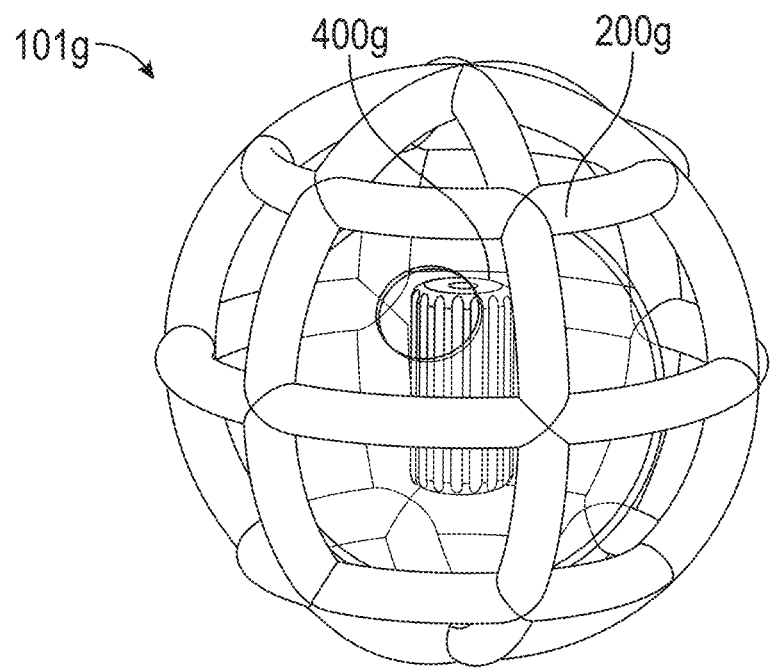
*FIG. 8A*
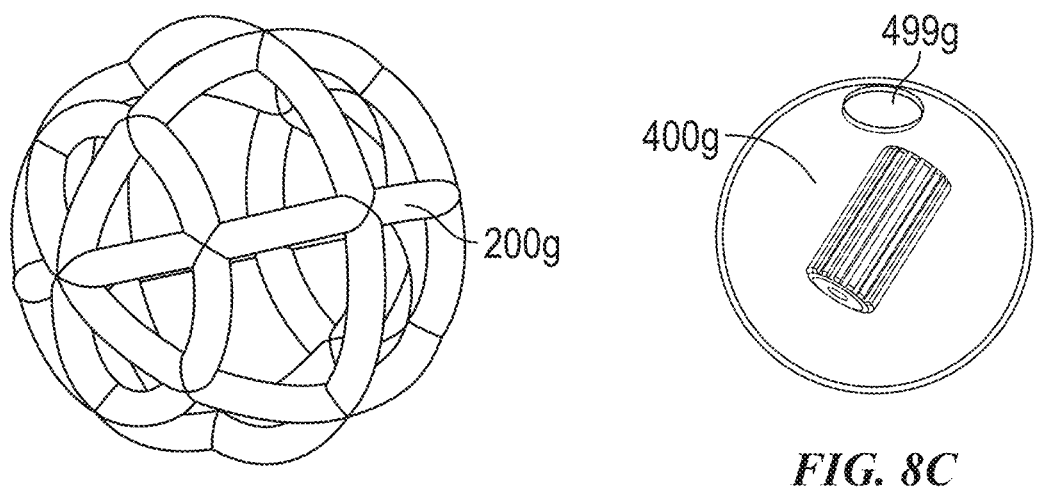
*FIG. 8B*
*FIG. 8C*

ANIMAL TREAT DISPENSER

CROSS-REFERENCE TO RELATED APPLICATIONS

This application claims the benefit of U.S. Application 63/294,334, filed Dec. 28, 2021, the contents of which are incorporated by reference herein.

FIELD

The present disclosure relates to an animal treat dispenser.

BACKGROUND

Various pet toys that dispense animal treats exist. For example, conventional pet toys have a variety of forms and arrangements of holes and openings. These treat-discharging toys generally include a wall, forming a hollow body configured for rolling and defining an interior cavity and one or more openings being dimensioned and configured for passage of animal treats into and out of the cavity.

SUMMARY

In one embodiment, there is provided an animal treat dispenser comprising a protective outer structure and an inner treat dispenser supported by the protective outer structure, the inner treat dispenser being provided with a resilient opening that is configured to accommodate and resiliently grip treats of different sizes. Various embodiments of protective outer structural frameworks and inner treat dispensers are disclosed.

BRIEF DESCRIPTION OF THE DRAWINGS

FIGS. 4A-4B show perspective views of an animal treat dispenser according to one embodiment.

FIG. 4C shows a perspective view of an inner treat dispenser according to one embodiment.

FIGS. 5A-5C show perspective views of a noisemaker, an protective outer structure, and an inner noisemaker, respectively, according to one embodiment.

FIGS. 8A-8C show perspective views of an object, an protective outer structure, and a component, respectively, according to one embodiment.

DETAILED DESCRIPTION OF THE PREFERRED EMBODIMENTS

Figure 1A:
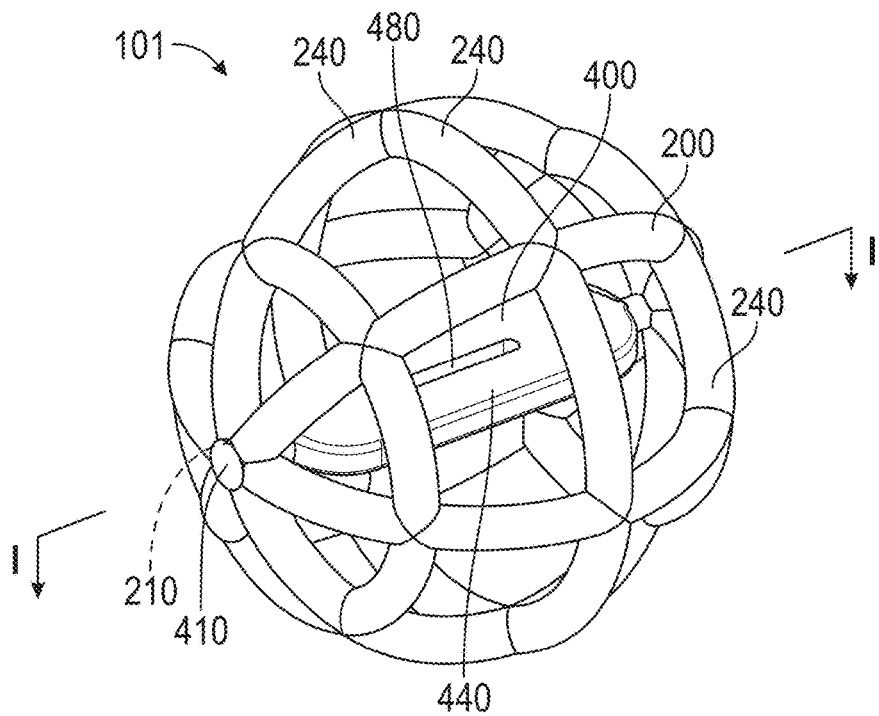
FIG. 1A shows a perspective view of an animal treat dispenser according to one embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 1B:
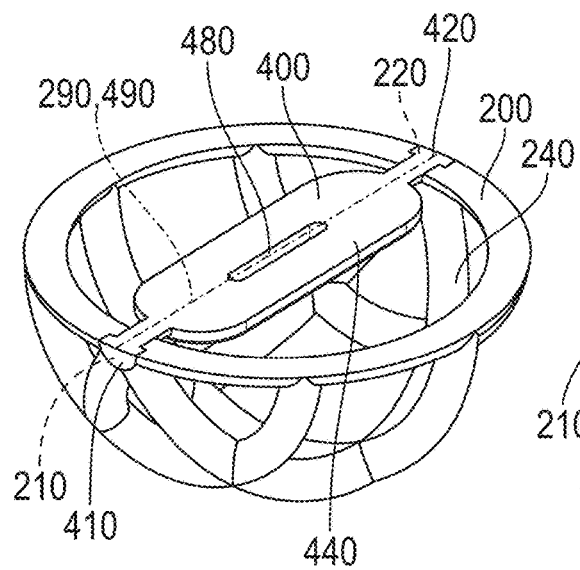
FIG. 1B shows a perspective view of an animal treat dispenser taken along the I-I line in FIG. 1A.
Figure 1C:
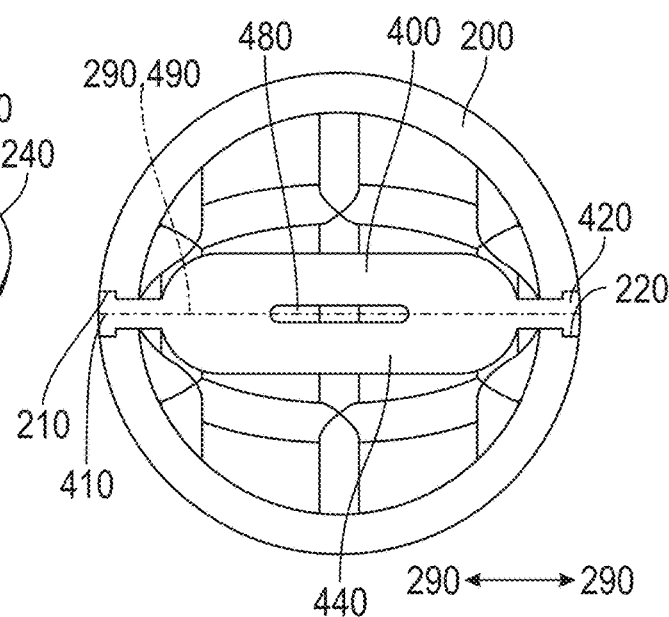
FIG. 1C shows a cross-sectional view of an animal treat dispenser taken along the I-I line in FIG. 1A.
Figure 2A:
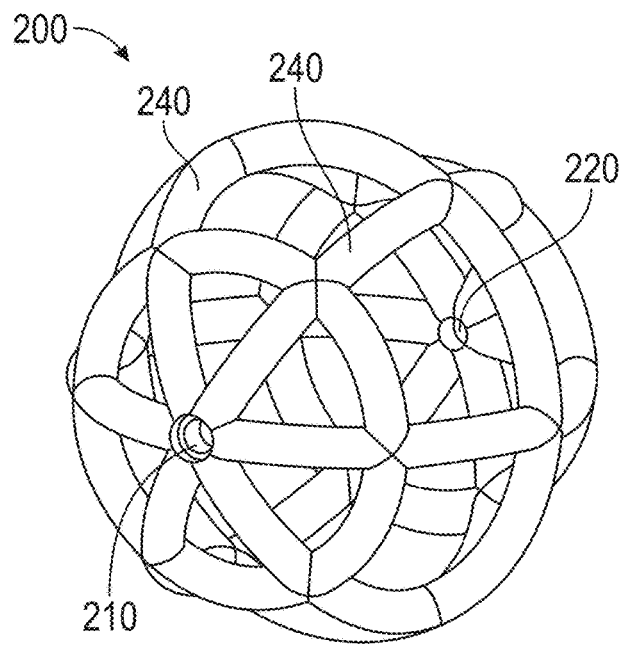
FIG. 2A shows a perspective view of a protective outer structure according to one embodiment.
Figure 2B:
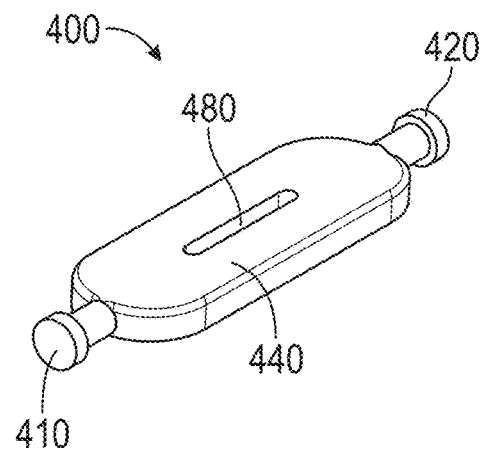
FIG. 2B shows a perspective view of an inner treat dispenser according to one embodiment.
Figure 2C:
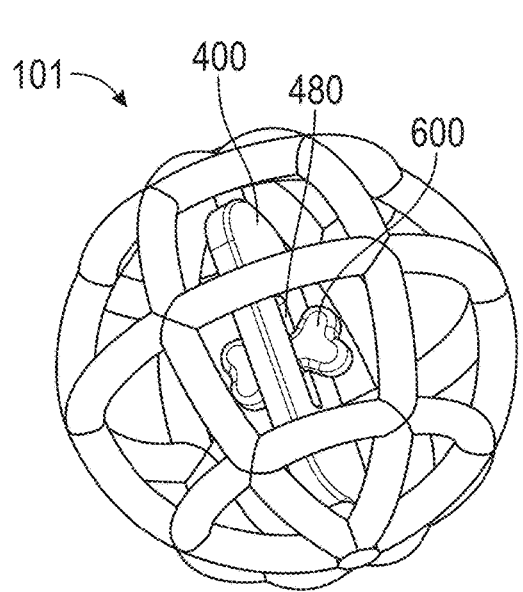
FIGS. 2C and 2D show perspective views of an animal treat dispenser in use according to one embodiment.
Figure 2D:
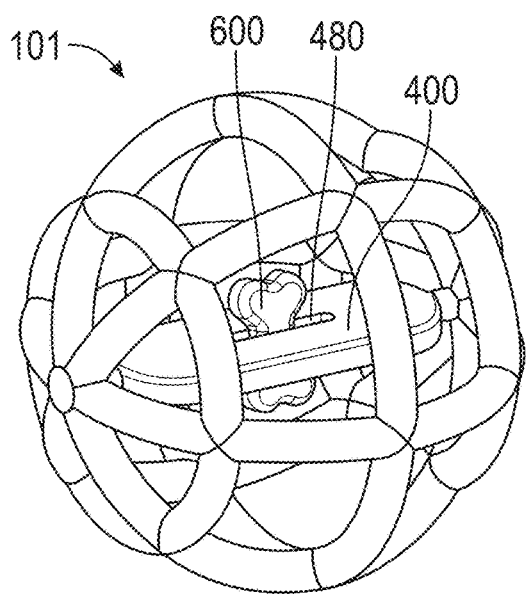

FIG. 1A shows a perspective view of an animal treat dispenser according to one embodiment. FIG. 1B shows a perspective view of an animal treat dispenser taken along the I-I line in FIG. 1A. FIG. 1C shows a cross-sectional view of an animal treat dispenser taken along the I-I line in FIG. 1A. FIG. 2A shows a perspective view of a protective outer structure according to one embodiment. FIG. 2B shows a perspective view of an inner treat dispenser according to one embodiment. FIGS. 2C and 2D show perspective views of an animal treat dispenser in use according to one embodiment.

The animal treat dispenser 101 shown in FIG. 1A may dispense treats of pets and spark pets' interests. In some embodiments, the animal treat dispenser 101 may be in any shape, such as spherical, cylindrical, or cone shape. In the illustrated example, the animal treat dispenser 101 is spherical, although other shapes are contemplated. The animal treat dispenser 101 may roll around on the floor or ground.

With reference to FIG. 1A, animal treat dispenser 101 may include a protective outer structure 200 and an inner treat dispenser 400. The protective outer structure 200 may be in any shape, such as, but not limited to spherical, cylindrical, or cone shape. In the illustrated example, the protective outer structure 200 is spherical. With reference to FIGS. 1B-1C, the protective outer structure 200 has a diameter 290. The protective outer structure 200 may be made of a hard plastic such as nylon, rubber, natural rubber or the like. Other materials are contemplated. With reference to FIGS. 1A-1C, protective outer structure 200 may include a plurality of elements 240. In the illustrated example, each of the elements 240 is cylindrical. In one embodiment, four or six elements 240 may be connected to each other, such that the elements 240 may form a plurality of openings, each of which may be trapezoidal, or triangular. As shown in FIGS. 1B, 1C, and 2A, protective outer structure 200 may be provided with a first opening 210 and a second opening 220. Each of the first opening 210 and the second opening 220 may engage with the inner treat dispenser 400.

With reference to FIGS. 1A-1C and 2B-2D, the inner treat dispenser 400 may be supported by the protective outer structure 200. As shown in FIGS. 1B-1C, the inner treat dispenser 400 may has an axis 490 extending along the diameter 290 of the protective outer structure 200. With reference to FIGS. 1A-1C and 2C-2D, the inner treat dispenser 400 may be fixed to the protective outer structure 200 along the diameter 290 so as to rotate around the diameter 290. In some embodiments, the inner treat dispenser 400 may be made of a hard plastic such as nylon, rubber, natural rubber or the like. In one example, the inner treat dispenser 400 may be made of natural rubber.

With reference to FIGS. 1B-1C and 2B-2D, inner treat dispenser 400 may be provided with a resilient opening 480. The resilient opening 480 may be configured to accommodate and resiliently grip treats 600 of different sizes. In one example, the resilient opening 480 may include a resilient elongated slot that is configured to accommodate and resiliently grip treats 600 of different sizes. The resilient elongated slot may extend along the diameter 290 of the protective outer structure 200. The shape and size of the resilient opening 480 is not limited to the illustrated example, and may be any other shape.

With reference to FIGS. 1B-1C and 2B-2D, the inner treat dispenser 400 may include a first fixture 410, a second fixture 420, and an intermediate portion 440. The first fixture 410 may be fixed to the protective outer structure 200. In some embodiments, the first fixture 410 may be rotatable relative to the protective outer structure 200. In some embodiments, the first fixture 410 may engage with the protective outer structure 200. For example, the first fixture 410 may be accommodated by the first opening 210 of the protective outer structure 200. In one example, the first fixture 410 may include a circular cross-section. However, the shape of the cross-section of the first fixture 410 may be in any other shape. The second fixture 420 may be fixed to the protective outer structure 200. In some embodiments, the second fixture 420 may engage with the protective outer structure 200. For example, the second fixture 420 may be accommodated by the second opening 220 of the protective outer structure 200. In one example, the second fixture 420 may include a circular cross-section. However, the shape of the cross-section of the second fixture 420 may be in any other shape. The intermediate portion 440 may be positioned between the first and second fixtures 410 and 420. The resilient opening 480 may be positioned in the intermediate portion 440. The intermediate portion 440 may include a plate shaped portion extending along the diameter 290 of the protective outer structure 200.

In the present embodiment, the inner treat dispenser 400 is provided with a resilient opening 480 that is configured to accommodate and resiliently grip treats 600 of different sizes. Therefore, the animal treat dispenser 101 can preferably dispense treats 600 of different sizes.

In the present embodiment, the inner treat dispenser 400 is fixed to the protective outer structure 200 along the diameter 290 so as to rotate around the diameter 290. Therefore, the animal treat dispenser 101 can dispense treats 600 easily by the animal's chewing of the treats 600 accommodated and resiliently gripped by the resilient opening 480 of the inner treat dispenser 400. The animal's chewing of the treat dispenser 400 and treats 600 retained therein also causes the treats 600 crumble and become dislodged from the treat dispenser 400.

In the present embodiment, the inner treat dispenser 400 is made of natural rubber. Such a configuration may be suitable for the resilient opening 480 to accommodate and resiliently grip treats 600 of different sizes.

Figure 3A:
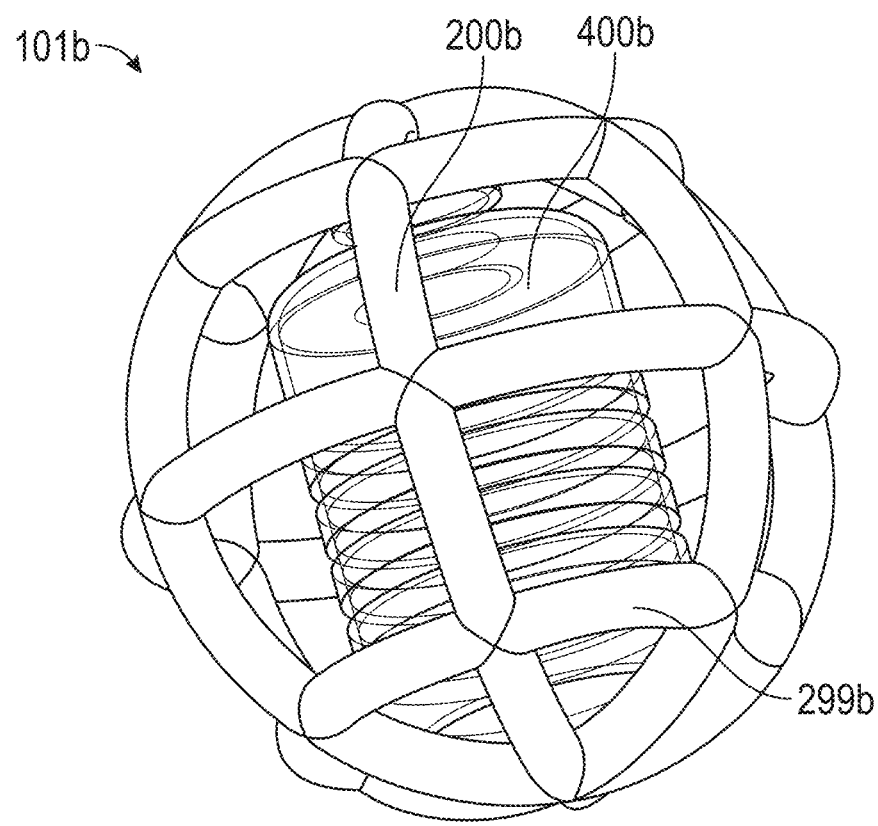
FIGS. 3A-3C show perspective views of an object, an protective outer structure, and an component, respectively, according to one embodiment.
Figure 3B:
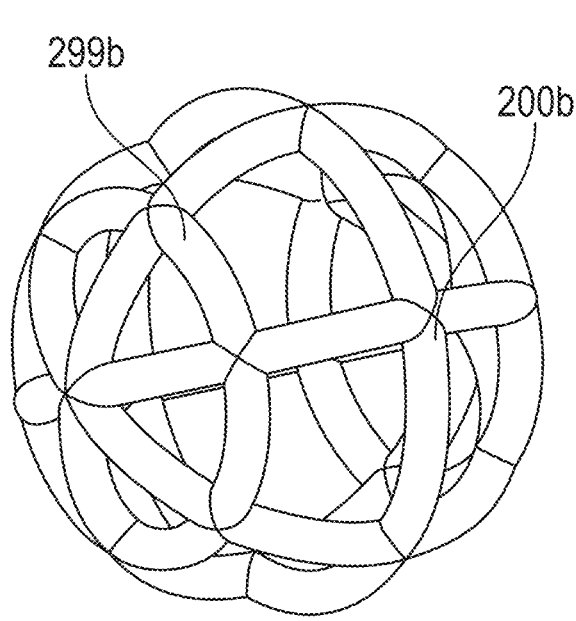
Figure 3C:
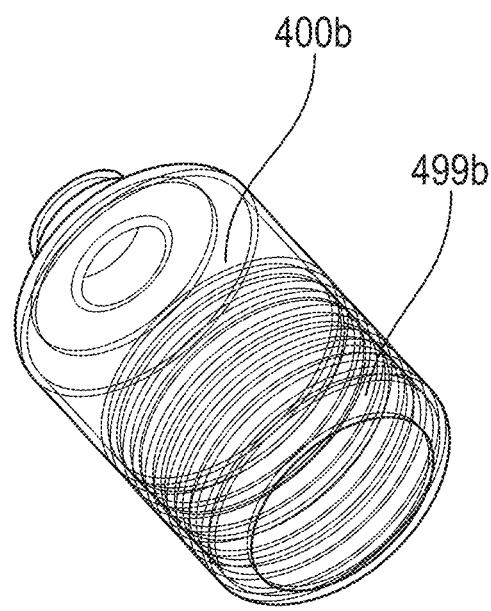

FIGS. 3A-3C show perspective views of an object, a protective outer structure, and a component, respectively, according to one embodiment.

The object 101b may include a protective outer structure 200b and a component 400b. The protective outer structure 200b may have the same or similar configuration of the protective outer structure 200 explained above. The component 400b may be made of any material, for example, a hard plastic such as nylon, rubber, natural rubber or the like. In the illustrated example, the component 400b is a plastic bottle without a top having a width that is aligned with a lower ring 299b of the protective outer structure 200b. In the illustrated example, the component 400b includes a bottom that has a circular edge 499b corresponding to the lower ring 299b. The shape of the component 400b is not limited to the illustrated example, and may be any other shape. The opening of the protective outer structure 200b is configured to allow the component 400b to actually be insertable into the protective outer structure 200b.

FIGS. 4A-4B show perspective views of an animal treat dispenser according to one embodiment. FIG. 4C shows a perspective view of an inner treat dispenser according to one embodiment.

The animal treat dispenser 101c may include a protective outer structure 200c and an inner treat dispenser 400c. The protective outer structure 200c may have the same or similar configuration of the protective outer structure 200 explained above. The inner treat dispenser 400c may be made of any material, for example, a hard plastic such as nylon, rubber, natural rubber or the like. The inner treat dispenser 400c may be in any shape, such as spherical, cylindrical, or cone shape. In the illustrated example, the inner treat dispenser 400c is spherical. In the illustrated example, the inner treat dispenser 400c is a baffled treat ball that has at least one baffle 498c (see FIG. 4C). The baffle 498c may extend inwardly from an inner surface of the inner treat dispenser 400c. The shape of the baffle 498c may be any shape, but in the illustrated example the shape of the baffle 498c is rectangular. The baffle 498c may hold the treats 600 temporarily. The inner treat dispenser 400c may be provided at least one opening 499c from which treats 600 are dispensed. In the illustrated example, the inner treat dispenser 400c is provided with two openings 499c. In some embodiments, the openings 499c may have the same size and the same shape. In other embodiments, as shown in FIG. 4C, one the openings 499c may be greater in size than the other of the openings 499c.

FIGS. 5A-5C show perspective views of a noisemaker, an protective outer structure, and an inner noisemaker, respectively, according to one embodiment.

The noisemaker 101d may include a protective outer structure 200d and an inner noisemaker 400d. The protective outer structure 200d may have the same or similar configuration of the protective outer structure 200 explained above. The inner noisemaker 400d may be made of any material and may generate noise through any means. The inner noisemaker 400d may be in any shape, such as spherical, cylindrical, or cone shape. In the illustrated example, the inner noisemaker 400d is cylindrical. In the illustrated example, the inner noisemaker 400d can contain noise making elements such that the inner noisemaker 400d can make noise.

Figure 6A:
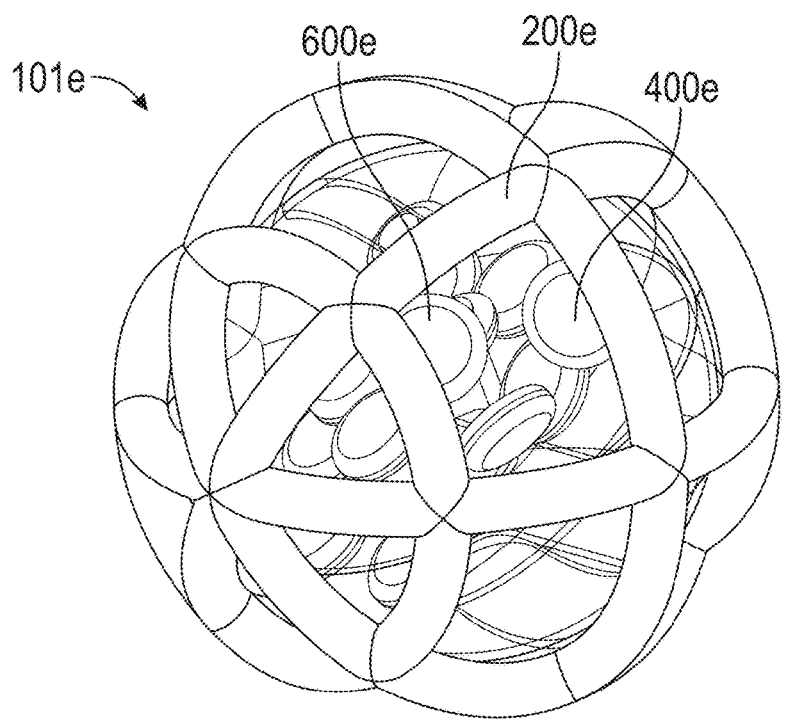
FIGS. 6A-6C show perspective views of an animal treat dispenser, an protective outer structure, and an inner treat dispenser, respectively, according to one embodiment.
Figure 6B:
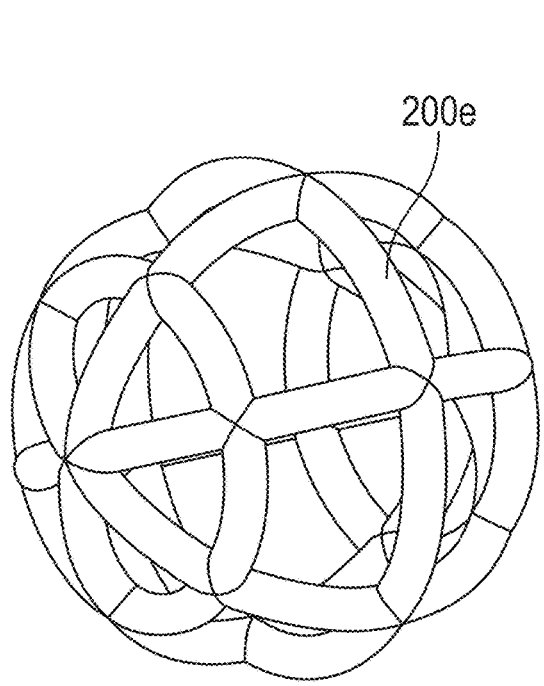
Figure 6C:
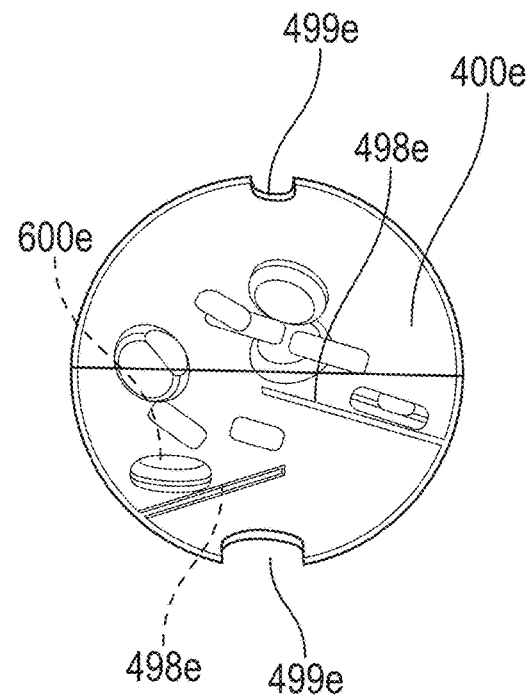

FIGS. 6A-6C show perspective views of an animal treat dispenser, a protective outer structure, and an inner treat dispenser, respectively, according to one embodiment.

The animal treat dispenser 101e may include a protective outer structure 200e and an inner treat dispenser 400e. The protective outer structure 200e may have the same or similar configuration of the protective outer structure 200 explained above. The inner treat dispenser 400e is the same as or similar to the inner treat dispenser 400c in FIG. 4C except that the inner treat dispenser 400e includes a plurality of baffles 498e (see FIG. 6C). In the illustrated example, the inner treat dispenser 400e includes two baffles 498c. The number of baffles in the inner treat dispenser 400e is not limited to two and may be more than two. In FIG. 6C, a left baffle 498c extends inwardly from an inner surface of the inner treat dispenser 400e, and a right baffle 498c extends inwardly from the inner surface of the inner treat dispenser 400e above the left baffle 498c. Each of the baffles 498c includes a part positioned between the two openings 499e.

Figure 7A:
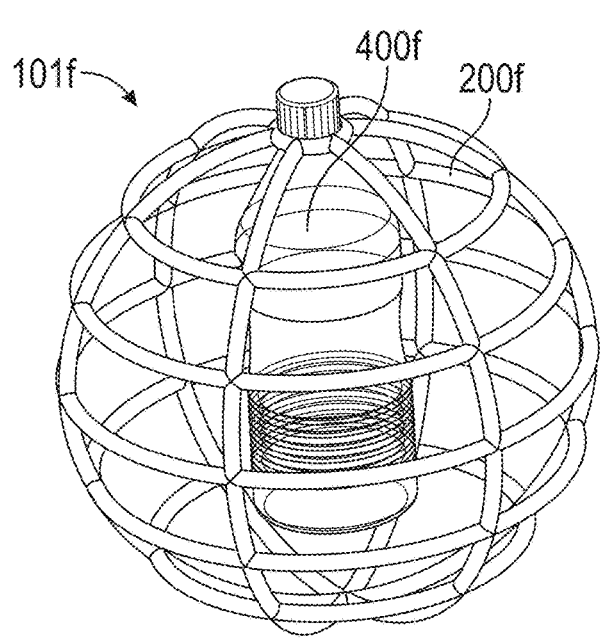
FIGS. 7A-7B respectively show a perspective view and a front view of an object according to one embodiment.
Figure 7B:
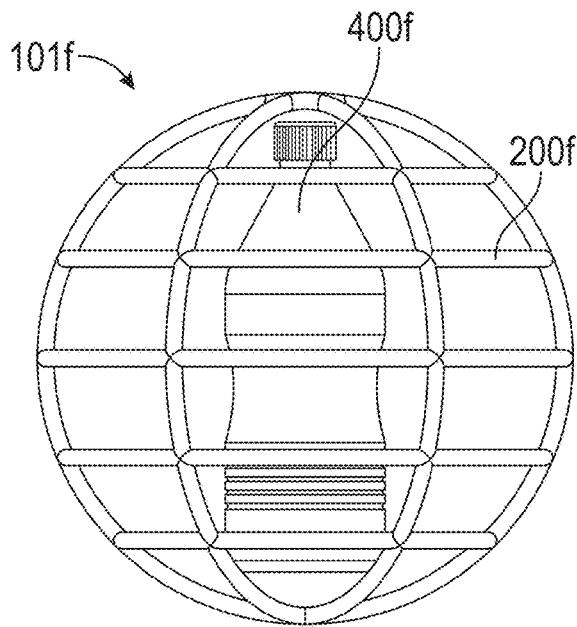
Figure 7C:
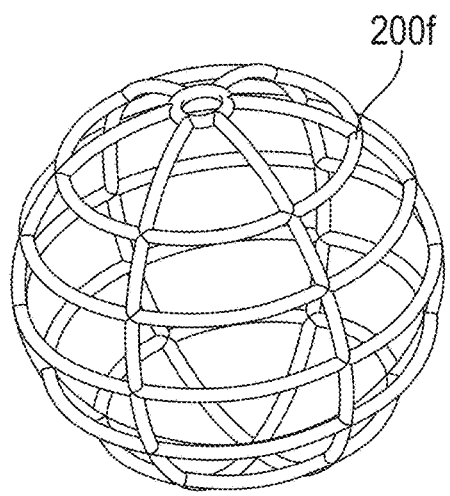
FIGS. 7C-7D respectively show a perspective view of a protective outer structure and a front view of a component according to one embodiment.
Figure 7D:
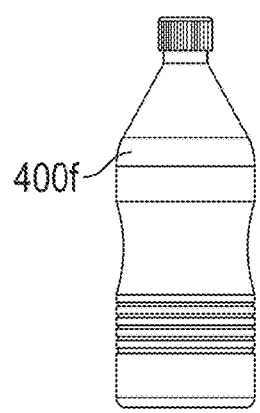

FIGS. 7A-7B respectively show a perspective view and a front view of an object according to one embodiment. FIGS. 7C-7D respectively show a perspective view of a protective outer structure and a front view of a component according to one embodiment.

The object 101f may include a protective outer structure 200f and a component 400f. The protective outer structure 200f may have the same or similar configuration of the protective outer structure 200 explained above. The component 400f may be made of any material, for example, a hard plastic such as nylon, rubber, natural rubber or the like. In the illustrated example, the component 400f is a plastic bottle having a cap that attached outside of the protective outer structure 200f.

FIGS. 8A-8C show perspective views of an object, a protective outer structure, and a component, respectively, according to one embodiment.

The object 101g may include a protective outer structure 200g and a component 400g. The protective outer structure 200g may have the same or similar configuration of the protective outer structure 200 explained above. The component 400g may be made of any material, for example, a hard plastic such as nylon, rubber, natural rubber or the like. The component 400g may be in any shape, such as spherical, cylindrical, or cone shape. In the illustrated example, the component 400g is spherical. In the illustrated example, the component 400g is a treat dispenser that accommodates a sound maker. The component 400g may move within the protective outer structure 200g. The component 400g may be provided with at least one opening 499g from which treats are dispensed, and via which the sound maker can be placed into the component 400g. The number of openings may be more than one. The shape of the opening 499c is circular, but may be any other shape.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An animal treat dispenser, comprising:
    a protective free-rolling ball including an axis around which the protective free-rolling ball is configured to rotate; and
    an inner treat dispenser supported by the protective free-rolling ball, the inner treat dispenser being provided with a resilient elongated opening that is configured to accommodate and resiliently grip treats of different sizes,
    wherein the resilient elongated opening extends longitudinally along the axis of the protective free-rolling ball, and
    wherein the inner treat dispenser relatively rotates, around an axis parallel to or coaxial with the axis of the protective free-rolling ball, to the protective free-rolling ball.

2. The animal treat dispenser of claim 1, wherein the protective free-rolling ball has a diameter that defines the axis, and wherein the inner treat dispenser is fixed to the protective free-rolling ball along the axis.

3. The animal treat dispenser of claim 2, wherein the resilient elongated opening includes a resilient elongated slot that is configured to accommodate and resiliently grip treats of different sizes.

4. The animal treat dispenser of claim 1, wherein the inner treat dispenser is made of natural rubber.

5. The animal treat dispenser of claim 1, wherein the inner treat dispenser is disposed in the protective free-rolling ball, and wherein the inner treat dispenser is configured to hold one of the treats that extends through the resilient elongated opening, such that the treat is visible from an outside of the protective free-rolling ball when viewed through the protective free-rolling ball.

6. An animal treat dispenser, comprising:
    a protective free-rolling ball including an axis around which the protective free-rolling ball is configured to rotate; and
    an inner treat dispenser supported by the protective free-rolling ball, the inner treat dispenser being provided with a resilient elongated opening that is configured to accommodate and resiliently grip treats of different sizes,
    wherein the resilient elongated opening extends longitudinally along the axis of the protective free-rolling ball,
    wherein the protective free-rolling ball has a diameter that defines the axis, and wherein the inner treat dispenser is fixed to the protective free-rolling ball along the axis, and
    wherein the inner treat dispenser includes:
    a first fixture fixed to the protective free-rolling ball;
    a second fixture fixed to the protective free-rolling ball, the second fixture being spaced apart from the first fixture in the direction of the axis; and an intermediate portion between the first and second fixtures, the resilient elongated opening being positioned in the intermediate portion.

7. The animal treat dispenser of claim 6, wherein each of the first and second fixtures engages with the protective free-rolling ball.

8. The animal treat dispenser of claim 6, wherein each of the first and second fixtures include a circular cross-section.

9. The animal treat dispenser of claim 6, wherein the intermediate portion includes a plate shaped portion extending along the axis of the protective free-rolling ball.

10. The animal treat dispenser of claim 6, wherein the protective free-rolling ball includes:
   a first opening engaging with the first fixture; and
   a second opening engaging with the second fixture.

11. The animal treat dispenser of claim 6, wherein the inner treat dispenser relatively rotates, around an axis parallel to or coaxial with the axis of the protective free-rolling ball, to the protective free-rolling ball.

12. An animal treat dispenser, comprising:
   a protective free-rolling ball including an axis around which the protective free-rolling ball is configured to rotate; and
   an inner treat dispenser supported by the protective free-rolling ball, the inner treat dispenser being provided with a resilient elongated opening that is configured to accommodate and resiliently grip treats of different sizes,
   wherein the resilient elongated opening extends longitudinally along the axis of the protective free-rolling ball, and
   wherein in a cross sectional view perpendicular to a longitudinal direction of the resilient elongated opening, the resilient elongated opening remains overlapping with the axis of the protective free-rolling ball during relative rotation of the inner treat dispenser to the protective free-rolling ball.

13. The animal treat dispenser of claim 12, wherein in the cross sectional view perpendicular to the longitudinal direction of the resilient elongated opening, the inner treat dispenser is entirely surrounded by an air space that is between the inner treat dispenser and the protective free-rolling ball.

14. The animal treat dispenser of claim 13, wherein the protective free-rolling ball includes a plurality of rods extending in different directions, and the protective free-rolling ball includes a plurality of polygonal openings, each of the polygonal openings being formed by at least three of the plurality of rods and being connected with the resilient elongated opening via the air space.

15. An animal treat dispenser, comprising:
   a protective free-rolling ball including at least two different axes around which the protective free-rolling ball is configured to rotate; and
   an inner treat dispenser supported in the protective free-rolling ball, the inner treat dispenser being provided with a resilient elongated opening that is configured to accommodate and resiliently grip treats of different sizes,
   wherein the resilient elongated opening extends longitudinally along one of the axes of the protective free-rolling ball, and
   wherein the protective free-rolling ball includes a plurality of rods extending in different directions, and the protective free-rolling ball includes a plurality of polygonal openings, each of the polygonal openings being formed by at least three of the plurality of rods and being connected with the resilient elongated opening via an air space in the protective free-rolling ball.

* * * * *